April 1, 1952      H. C. FLINT      2,591,347
MOVABLY SUPPORTED SPRING SEAT CONSTRUCTION
Filed July 6, 1946      2 SHEETS—SHEET 1

INVENTOR:
Hyland C. Flint
BY Thiess Olson + Mecklenburger
ATTYS:

April 1, 1952     H. C. FLINT     2,591,347
MOVABLY SUPPORTED SPRING SEAT CONSTRUCTION
Filed July 6, 1946     2 SHEETS—SHEET 2
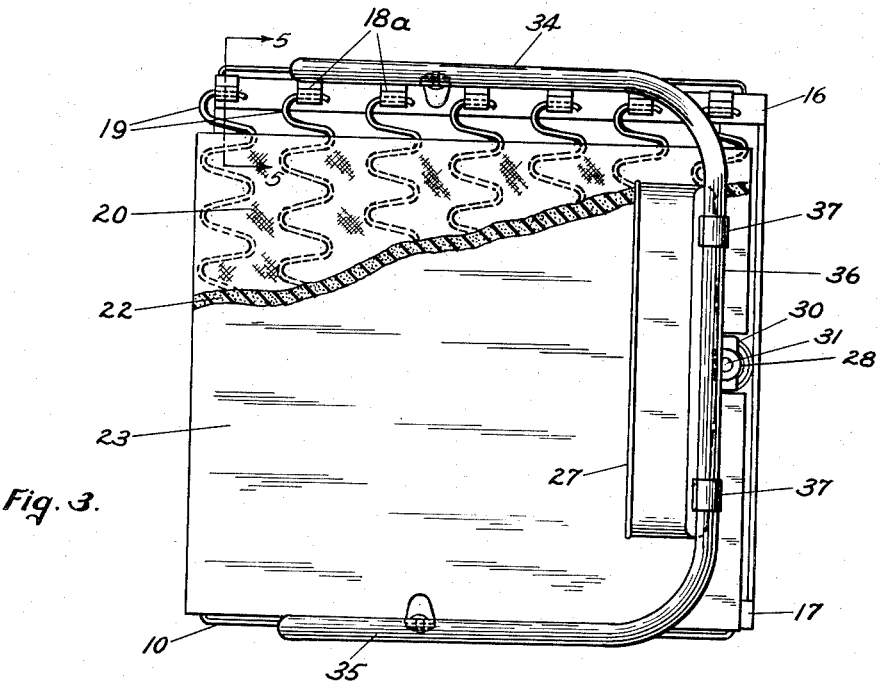
Fig. 3.
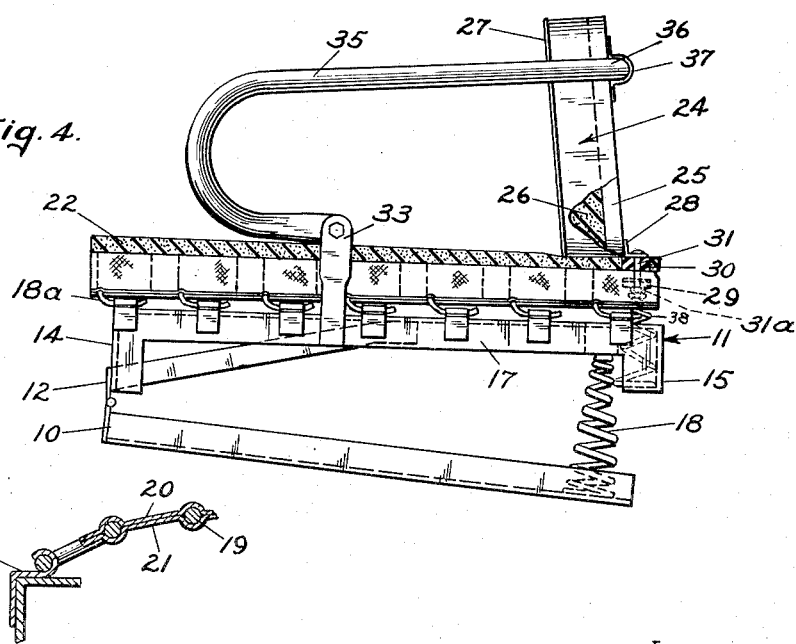
Fig. 4.
Fig. 5.
INVENTOR:
Hyland C. Flint
BY Thiess Olson & Mecklenburger
ATTYS:

Patented Apr. 1, 1952

2,591,347

UNITED STATES PATENT OFFICE 2,591,347

MOVABLY SUPPORTED SPRING SEAT CONSTRUCTION

Hyland C. Flint, Akron, Ohio

Application July 6, 1946, Serial No. 681,695

11 Claims. (Cl. 155—53)

The present invention relates to seat constructions for general use, such as in vehicles and furniture, and has special reference to relatively simple, compact seats having a resilient seat portion for supporting a person, and a back rest connected to said seat portion and movable vertically with the user of the seat to effect a somewhat floating effect.

More particularly this invention relates to a seat construction comprising a preferably resiliently supported seat frame having a plurality of resilient members mounted thereon forming a weight-supporting seat portion. A back rest portion is supported by at least one of said resilient members and means extending forwardly of the back rest portion may be mounted on the seat frame for permitting vertical movement of said back rest portion and preventing rearward movement thereof.

In vehicles, such as tractors, it is desirable to have a back rest portion which, while providing substantial support, will not pound or punch the back of the user even when the vehicle is subjected to considerable fore and aft pitching. The present seat is provided with such a back rest which may be rounded or otherwise shaped at the lower portion to substantially conform to the shape of the resilient member or members thereunder when the latter are depressed or under compression.

An object of the present invention is to provide a resilient seat construction having a back rest portion arranged to move vertically with the user of the seat while being substantially prevented from rearward movement.

A further object is to provide a seat construction in which the means for permitting vertical movement of the back rest portion while preventing rearward movement thereof extend forwardly from said back rest portion and may be carried entirely on the seat frame.

Another object is to provide a seat construction of the above type which may be sufficiently compact to be suitably mounted on a tractor or other vehicle having relatively little space therefor.

Still another object is to provide a seat construction in which punching or pounding of the user by the back rest due to pitching of the vehicle carrying the seat is reduced to a minimum.

An additional object is to provide a seat construction of the type referred to above, which is relatively stable and substantially free of all sidesway with respect to the support on which it is mounted.

Further objects and advantages will be apparent from the following description and claims when considered with the accompanying drawings in which:

Fig. 3 is a top plan view of the seat with a portion broken away;

Fig. 4 is a side elevational view of the seat with a portion broken away; and

Fig. 5 is a cross-sectional view taken along the line 5—5 of Fig. 3.

Figure 1:
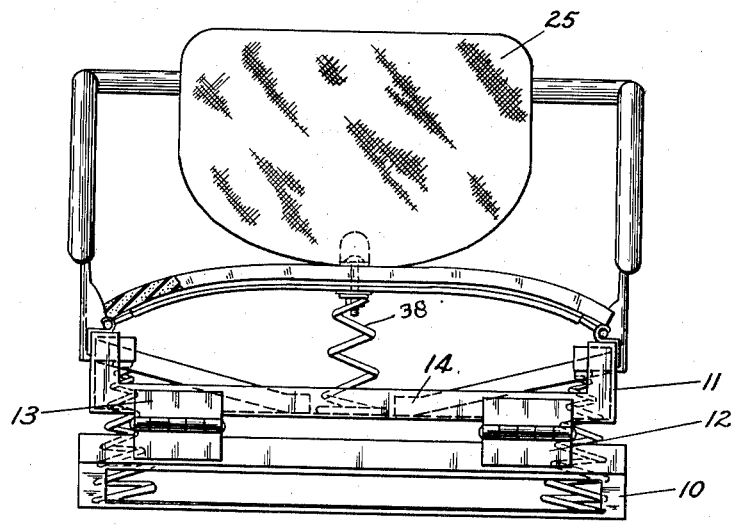
Fig. 1 is a front elevation of a seat embodying the present invention.

Referring more particularly to the drawings there is shown a seat construction embodying the present invention, which in the specific form illustrated is particularly suitable for use in tractors and similar vehicles.

The seat comprises an angle iron base 10, with a seat frame 11 mounted thereon, which also may be made of angle iron. Both the base 10 and the seat frame 11 are preferably rectangular in shape and of substantially the same size as the weight-supporting portion of the seat. The front of the seat frame 11 may be pivotally secured to the front of the base 10 by a pair of hinges 12 and 13. The hinges permit the rear portion of the seat frame 11 to be moved substantially vertically while preventing horizontal movement of the seat frame with respect to its base. The front and rear sides or connecting members 14 and 15, respectively, of the seat frame preferably are arranged below the longitudinally extending side portions 16 and 17 of the frame. The rear of the seat frame may be resiliently supported by a pair of coil springs 18 having their lower ends positioned on the base 10. If desired, the frame 11 may be directly connected to the vehicle.

In order to provide a soft weight-supporting seat portion for the seat, resilient means are mounted on the frame 11. While various types of resilient means may be employed, yielding strips 19 of the type disclosed in Kaden Patent No. 2,002,399, dated May 21, 1935, are preferably used. These yielding strips comprise wires of circular cross section having substantially horizontally extending undulations. During manufacture of these strips the wire undulations are given a permanent arcuate set of comparatively small radius. The strips are thereafter extended from this normally small radius by fixedly securing the ends thereof so that their curvature conforms to the desired arch of the seat. When a weight is disposed on the yielding strips a further enlargement of the radius is obtained, which is resisted by the small radius of set. As shown in the drawings, the yielding strips are arranged transversely of the seat with their ends connected to the clips 18a on the seat frame sides 16 and 17. This is preferred as it makes for greater stability of the weight-supporting portion of the seat, substantially eliminating sidesway thereof. However, the yielding strips under certain conditions may extend from the front to the rear of the seat portion.

Arranged on each side of the yielding strips 19 are flexible fabric sheets 20 and 21. These sheets are preferably provided with adhesive on their opposed faces so that after being positioned on opposite sides of the yielding strips the portions intermediate the strips may be secured together. There is thus formed a resilient, unitary, weight-supporting structure comprising the yielding strips 19 and the flexible fabric sheets 20 and 21. The fabric strips further tend to prevent sidesway or other horizontal movement of the yielding strips and also tend to equalize the action of the strips in resisting the weight of a person thereon by distributing the load.

Although the rearwardly extending sides of the flexible sheets 20 and 21 are not secured to the sides of the seat frame, they are fixed with respect thereto through the ends of the yielding strips which extend beyond the sides of the fabric sheets. In case the yielding strips are secured to the front and rear sides of the seat frame, the use of the fabric sheets is of even greater benefit in preventing sidesway of the yielding strips.

A resilient layer or pad 22 is placed on the yielding strips over the top fabric sheet 20 and the whole seat surface is thereafter finished by being covered with any suitable material, such as leather or fabric 23.

The construction heretofore described provides a very soft resilient weight-supporting seat portion. The double springing resulting from the use of the coiled springs and the yielding strips greatly reduces bouncing and rebound as the two resilient means being different in character, action and results cooperate to produce a smooth, floating effect.

A substantially vertically extending back rest portion 24 is positioned adjacent the rear of the seat portion over the yielding strips 19. The back rest 24 may comprise a back board or frame 25 having a soft, resilient pad 26 thereon, over which is arranged a cover layer 27 of suitable finishing material.

The back rest 24 may have a bracket 28 for being secured to one or more of the yielding strips adjacent the rear of the seat portion, preferably the rearmost yielding strip. For this purpose lower and upper wear pads 29 and 30, respectively, are placed on each side of this yielding strip and a bolt 31 passed therethrough and through the bracket 28, being held in place by a nut 31a. Thus the back rest portion 24 rests on the upper wear pad 30 and may move vertically with the yielding strip over which it is positioned or to which it is connected.

Means are provided for permitting substantially vertical movement of the back rest portion while substantially preventing any rearward or forward movement thereof. Such means comprise posts 32 and 33 mounted on the rearwardly extending sides 16 and 17 of the seat frame 11. The posts preferably extend above the seat portion and are positioned forwardly of the back rest portion 24 a substantial distance. While the posts 32 and 33 are preferably thus mounted on the sides of the seat frame 11, they may be fixedly mounted on the base 10 or on the vehicle carrying the seat construction. A pair of arms 34 and 35 extend forwardly from the back rest portion to the posts 32 and 33 to which they are preferably pivotally connected by means permitting movement about a horizontal axis while substantially preventing sidewise movement. The arms may be shaped as shown with substantially horizontal arm supporting portions to serve as arm rests. The rear portions of the arms 34 and 35 are pivotally connected to the back rest, by a suitable means, this being accomplished in the illustrated structure by the cross piece 36 which rotatably passes through the brackets 37 on the rear of the back rest portion 24. While the forward ends of the arms 34 and 35 are preferably connected to the posts 32 and 33 they may be pivotally connected to the sides of the seat frame 11.

Figure 2:
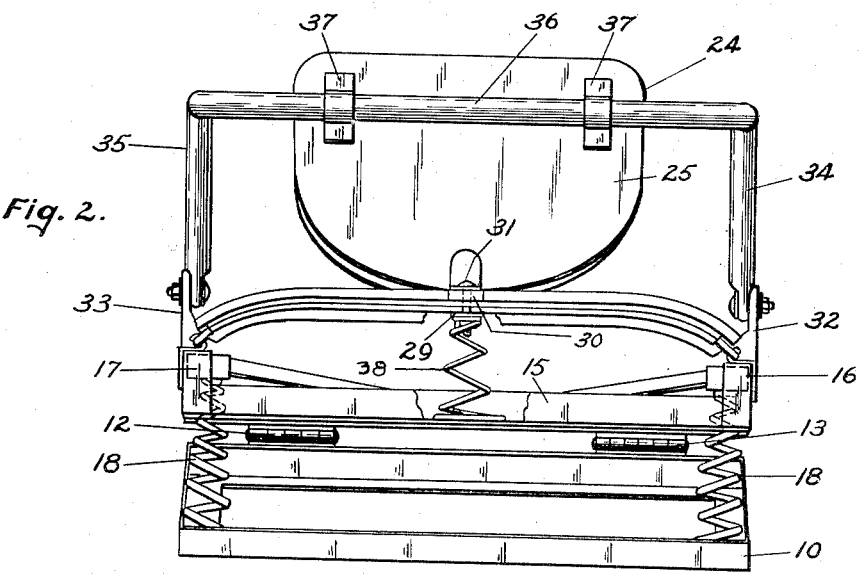
Fig. 2 is a rear elevation of the seat.

The back rest portion 24 shown in the drawings, being intended for use as a tractor seat, is relatively low to provide sufficient freedom for the operator of the tractor while minimizing any slapping or punching of the operator due to fore and aft pitching of the vehicle. It is preferably less than fifteen inches in height above the seat portion and may be about six or eight inches in height thereabove. The bottom of the back rest portion 25 is preferably rounded as shown in Figs. 1 and 2 so that it has substantially the same shape or curvature that the yielding strips assume when subjected to compression or downward displacement.

The tractor operator by leaning against the back rest portion causes a downward component of force thereagainst which moves it downwardly against the action of the yielding strip supporting it. Thereafter, the back rest will remain substantially fixed with respect to the seat user. If the user moves upwardly, the downward component of force is reduced and the yielding strip raises the back rest frame, while if the seat user moves downwardly, the downward component of force against the back rest portion is increased to further depress it.

It has been found advisable in some instances to employ auxiliary resilient means to resist depression of the yielding strip beneath the back rest. While a heavier yielding strip may be employed, means such as a coil spring 38 have proved very satisfactory. The spring 38 may be mounted on the rear transverse connecting member 15 or a plate carried thereby with the upper end engaging the bolt 31 whereby it is properly positioned. Obviously, resilient means other than the coil spring 38 may be employed.

There is thus provided a light, simple, compact seat in which the back rest portion moves vertically with the seat portion and the user thereof to provide in effect a floating ride even over the roughest terrain.

I claim:

1. In a seat construction, a plurality of substantially horizontally arranged transversely extending yielding strips forming a weight-supporting seat portion, a back rest portion supported on said seat portion substantially over a yielding strip and movable vertically therewith, the lower side of said back rest portion being shaped to substantially fit the curvature of the yielding strip thereunder when said strip is depressed, and means for permitting substantially vertical movement of said back rest portion and substantially preventing rearward movement thereof.

2. In a seat construction, a plurality of substantially horizontally arranged transversely extending yielding strips forming a weight-supporting seat portion, a back rest portion supported on said seat portion substantially over a yielding strip and movable vertically therewith, the lower side of said back rest portion being shaped to substantially fit the curvature of the yielding strip thereunder when said strip is depressed, means for connecting said back rest portion to the yielding strip substantially thereunder, and means for permitting substantially vertical movement of said back rest portion while substantially preventing rearward movement thereof.

3. In a seat construction, a seat frame for being arranged in a substantially horizontal position, transversely extending yielding strips mounted on said frame forming a resilient weight-supporting seat portion, a back rest portion supported on said seat portion substantially over a yieldable strip and movable vertically therewith, the lower part of said back rest portion being reduced in width toward the transverse center thereof, and means carried by said seat frame for permitting substantially vertical movement of said back rest portion and substantially preventing rearward movement thereof.

4. In a seat construction, a plurality of substantially horizontally arranged transversely extending yielding strips forming a weight-supporting seat portion, a back rest portion positioned substantially over a yielding strip and movable vertically therewith, resilient means tending to prevent depression of said yielding strip, and means for permitting substantially vertical movement of said back rest portion and substantially preventing rearward movement thereof.

5. In a seat construction, a seat frame, a plurality of substantially horizontally arranged transversely extending yielding strips mounted on said frame forming a weight-supporting seat portion, a back rest portion positioned substantially over a yielding strip and movable vertically therewith, resilient means mounted on said frame tending to prevent depression of said yielding strip, and means for permitting substantially vertical movement of said back rest portion and substantially preventing rearward movement therewith.

6. In a seat construction, a seat frame for being mounted on a support, resilient means carried by said seat frame forming a substantially horizontal weight-supporting seat portion, a back rest connected to said resilient means and movable vertically therewith, an upwardly extending post fixedly mounted on each side of said seat frame a substantial distance forwardly of said back rest, and an arm at each side of said seat, said arms being pivotally mounted adjacent their forward ends to the upper ends of said posts with their opposite ends extending rearwardly therefrom and connected to said back rest a substantial distance above the bottom side thereof to substantially prevent rearward movement of said back rest while permitting substantially vertical movement thereof with said resilient means.

7. In a seat construction, a seat frame for being mounted on a fixed support, resilient means carried by said seat frame forming a substantially horizontal weight-supporting seat portion, means for resiliently supporting at least the rear of said seat frame, a back rest connected to said first resilient means and movable vertically therewith, an upwardly extending post fixedly mounted on each side of said seat frame a substantial distance forwardly of said back rest, and an arm at each side of said seat, said arms being pivotally mounted adjacent their forward ends to the upper ends of said posts with their opposite ends extending rearwardly therefrom and connected to said back rest a substantial distance above the bottom side thereof to substantially prevent rearward movement of said back rest while permitting substantial vertical movement thereof with said resilient means.

8. In a seat construction a plurality of transversely extending yielding strips arranged to form a substantially horizontal, resilient, weight-supporting seat portion, a back rest portion positioned substantially over at least one of said yielding strips at the rear of said seat portion, means connecting said back rest and said last mentioned yielding strip whereby said back rest is movable vertically with said strip, said last mentioned yielding strip being provided with resilient means tending to prevent depression of said strip, and means for permitting substantially vertical movement of said back rest portion and substantially preventing rearward movement thereof.

9. In a seat construction, a seat frame, a plurality of transversely extending yielding strips mounted on said frame and arranged to form a substantially horizontal, resilient, weight-supporting seat portion, a back rest portion positioned substantially over at least one of said yielding strips at the rear of said seat portion, means connecting said back rest and said last mentioned yielding strip whereby said back rest is movable vertically with said strip, said last mentioned yielding strip being provided with downwardly extending resilient means engaging said seat frame tending to prevent depression of said strip, and means for permitting substantially vertical movement of said back rest portion and substantially preventing rearward movement thereof.

10. In a seat construction, a seat frame for being mounted on a support, a plurality of transversely extending yielding strips mounted on said frame and arranged to form a substantially horizontal, resilient, weight-supporting seat portion, a back rest portion positioned substantially over at least one of said yielding strips at the rear of said seat portion, means connecting said back rest and said last mentioned yielding strip whereby said back rest is movable vertically with said strip, said seat construction having a pair of fixed, spaced anchoring means a substantial distance forwardly of said back rest, said anchoring means being positioned on opposite sides of the fore-and-aft center line of said seat, a pair of arms pivotally mounted adjacent their forward ends to said anchoring means about a substantially horizontal axis with their opposite ends extending rearwardly therefrom and connected to said back rest portion a substantial distance above the bottom side thereof to substantially prevent rearward movement of said back rest while permitting substantially vertical movement thereof.

11. In a seat construction, a seat frame for being mounted on a support, a plurality of transversely extending yielding strips mounted on said frame and arranged to form a substantially horizontal, resilient, weight-supporting seat portion, a back rest portion positioned substantially over at least one of said yielding strips at the rear of said seat portion, means connecting said back rest and said last mentioned yielding strip whereby said back rest is movable vertically with said strip, said last mentioned yielding strip being provided with downwardly extending resilient means engaging said seat frame tending to prevent depression of said strip, said seat construction having a pair of fixed, spaced anchoring means a substantial distance forwardly of said back rest, said anchoring means being positioned on opposite sides of the fore-and-aft center line of said seat, a pair of arms pivotally mounted adjacent their forward ends to said anchoring means about a substantially horizontal axis with their opposite ends extending rearwardly therefrom and connected to said back rest portion a substantial distance above the bottom side thereof to substantially prevent rearward movement of said back rest while permitting substantially vertical movement thereof.

HYLAND C. FLINT.

REFERENCES CITED

The following references are of record in the file of this patent:

UNITED STATES PATENTS

| Number | Name | Date |
| --- | --- | --- |
| 1,004,082 | Riley | Sept. 26, 1911 |
| 1,406,059 | Montgomery | Feb. 7, 1922 |
| 2,100,475 | Flint | Nov. 30, 1937 |
| 2,324,152 | Haber | July 13, 1943 |